Figure 1:
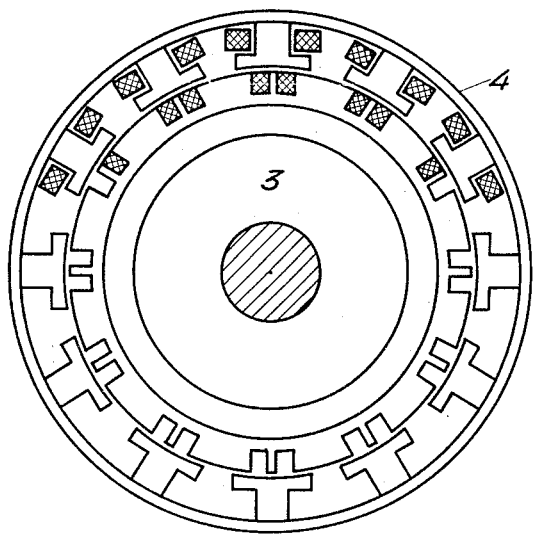

June 1, 1943.  N. ERICSOM  2,320,721

ELECTRODYNAMIC OSCILLATION DAMPER

Filed July 18, 1939  2 Sheets-Sheet 1

Inventor
Nils Ericsom
per [signature]
Attorney.

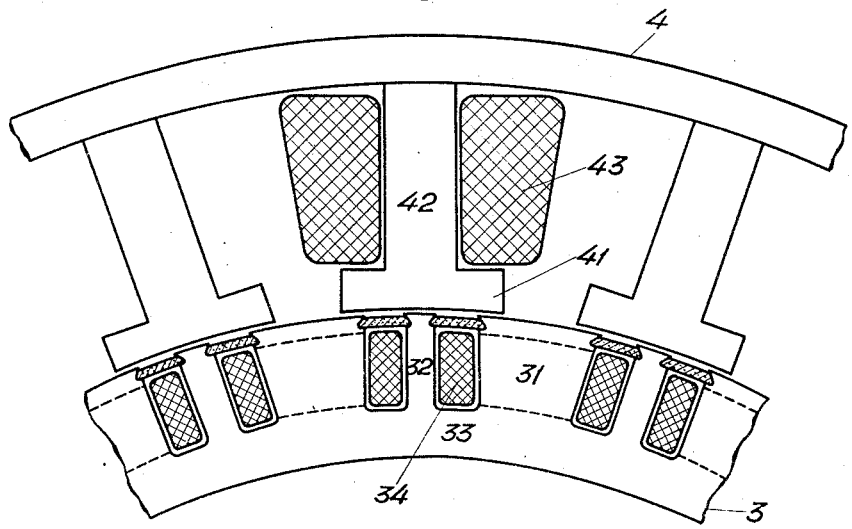
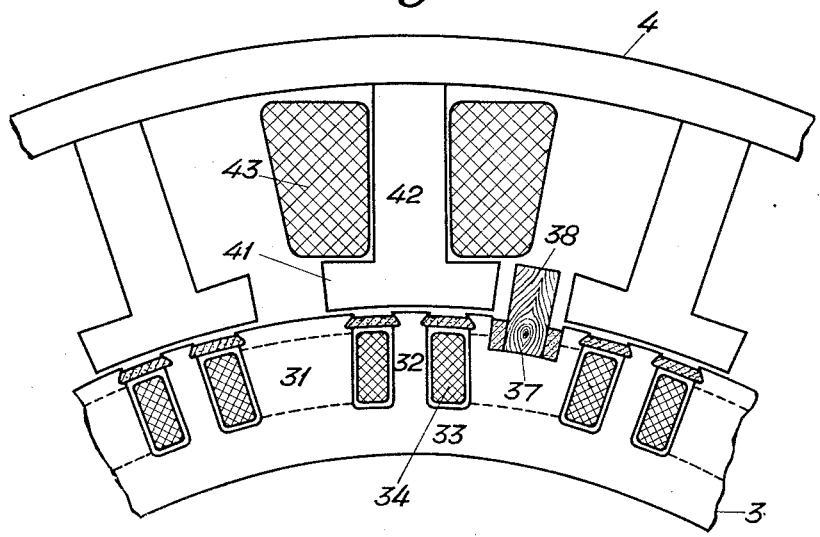

Patented June 1, 1943

2,320,721

UNITED STATES PATENT OFFICE 2,320,721

ELECTRODYNAMIC OSCILLATION DAMPER

Nils Ericson, Stockholm, Sweden, assignor to Allmänna Svenska Elektriska Aktiebolaget, Vasteras, Sweden, a corporation of Sweden Application July 18, 1939, Serial No. 285,087
In Sweden July 19, 1938

6 Claims. (Cl. 74—574)

It is known that angular oscillations arise on certain occasions in rotating bodies when their proper frequency of oscillation coincides with that of periodical variations in a torque affecting them. Subject to such oscillations are especially the shafts of internal combustion engines, particularly an engine having a plurality of cylinders and a long shaft with many cranks. Also ship propeller shafts may sometimes come into resonance with irregularities of the countertorque of the propeller. Such oscillations may cause heavy torsional stresses in the material of the shaft which have on many occasions led to fractures by fatigue after only a short time of function. For a certain shaft, generally only oscillations of a single defined frequency arise, the node and antinode of which always occur at certain places in the shaft. Depending on the number of nodes, the oscillations are termed of the first, second, etc., degree. A resonance of oscillation may, however occur at different numbers of revolutions of the machine; the condition is, that for such a number of revolutions, periodical irregularities of the torque occur in the same rhythm as the proper frequency of oscillation of the shaft. In a common Diesel engine having several cylinders, the driving shaft end of which is solidly connected to a comparatively heavy electrical generator or the like immediately outside the engine, an oscillation of the first degree generally occurs, the node of which lies near the generator, while the antinode or loop lies at the opposite end of the shaft. At the last-mentioned place, the amplitude of the deviation angle will then be a maximum, while the torsional stress of the material is a maximum at the node.

For limiting the value of such proper oscillations, so called oscillation dampers of mechanical or electrodynamical type have been used. The action of the mechanical dampers has generally been based on the friction between solid bodies or in liquids. The electrodynamical dampers have generally consisted of electrical machines of substantially common type, for instance direct current or alternating current machines of asynchronous or synchronous type, in the latter case sometimes with a damping winding.

The mechanical dampers have been found unreliable in their action to a certain extent, and the electrical ones have not, in their earlier form, been found sufficiently efficient at reasonable dimensions and costs. The permissible angular movements of the oscillating shaft are so small that their translation into a sufficient electrical power for the damping would require machines of too large dimensions.

A proposed method of increasing the angular movements by creating the well-known hunting phenomenon between the two mutually rotating members of a machine of synchronous type fails on the ground, among others, that the frequency of such hunting movements is in practice always much lower than the dangerous oscillation frequencies of shafts and similar members.

The present invention is founded, in the first place, on the observation that the really dangerous oscillations in shafts and other rotatable bodies occur only at certain determined frequencies, and secondly on the fact that the electrical power in the damper is, at these frequencies, substantially limited by the inductance of the circuits. In an electrical damper, which consists of a member with an angularly rigid connection to the oscillating body and a member separated from the aforesaid one by an air gap and being at least comparatively free to rotate with respect to said body, one of said bodies having magnet poles and the other having an armature winding, the said winding is, therefore, according to the invention, of the alternating current type and connected to a capacitative load circuit, which essentially compensates the inductances comprised in the circuit at the frequency of the oscillations to be damped. The capacitative load preferably consists of a condenser, but other load types of a capacitative character, as an over-excited synchronous motor or a rectifier with anticipated commutation, may be employed.

Generally, it may be most suitable to connect the member, which is comparatively free to rotate on the shaft, with the other member or directly with the shaft by some type of resilient device, so that the former member rotates at an approximately constant angular speed which is equal to the mean value of the variable angular speed of the shaft, disturbed by the torsional oscillations. The constancy of the speed of the resiliently driven member is the more pronounced, the larger its moment of inertia is with respect to that of the rigidly driven member. It is therefore, as well as for avoiding an essential influence of the damper itself on the proper frequency of oscillation of the shaft, most suitable to mount the rigidly driven member inside the other and cause it to form the electric armature, which can be made lighter than the member carrying the magnetic poles. If the connecting devices are made so resilient as not to influence materially the said heavier member, the proportion between the angular amplitudes of the latter and of the former will be inversely that of the moments of inertia of the members, that is, the amplitude of the heavier member will be much smaller than that of the lighter one. As, moreover, the two oscillations are approximately in 90° mutual phase displacement, the relative angular movements and angular speed of the two members will be practically that obtained if the resiliently driven member were rotating at constant angular speed.

It might also be possible to introduce such stiff springs as a mechanical connection between the two members, that a mechanical resonance would arise between these springs and the masses at the proper oscillation frequency of the shaft. In such a case the resiliently driven member would oscillate in the opposite sense against the rigidly driven one, and the mutual angular displacement would in this way be considerably increased over that obtained with respect to a member rotating at constant speed. Apart from the risk of introducing in this way a mechanical resonance element which cannot be adjusted during operation, such a device becomes at any rate comparatively unreliable on account of the risk of fatigue in the connecting springs, at least in the present state of the art. It is therefore generally advisable to make the connecting springs, if such are used, so elastic as not to materially influence the oscillations, but only to be sufficient to overcome the air friction at the rotation of the resiliently driven member. By the spring action, the last-mentioned member will then occupy a mean position with respect to the other member, which lags a little behind the mean position at standstill, and attention should be paid hereto in determining said latter position.

A resilient drive of one member by the other may also be accomplished in a magnetic way by an appropriate shaping of certain magnetically active portions of both members. In such a case, only a small driving force can be obtained for overcoming friction and the like, but no mechanical resonance.

Figure 2:
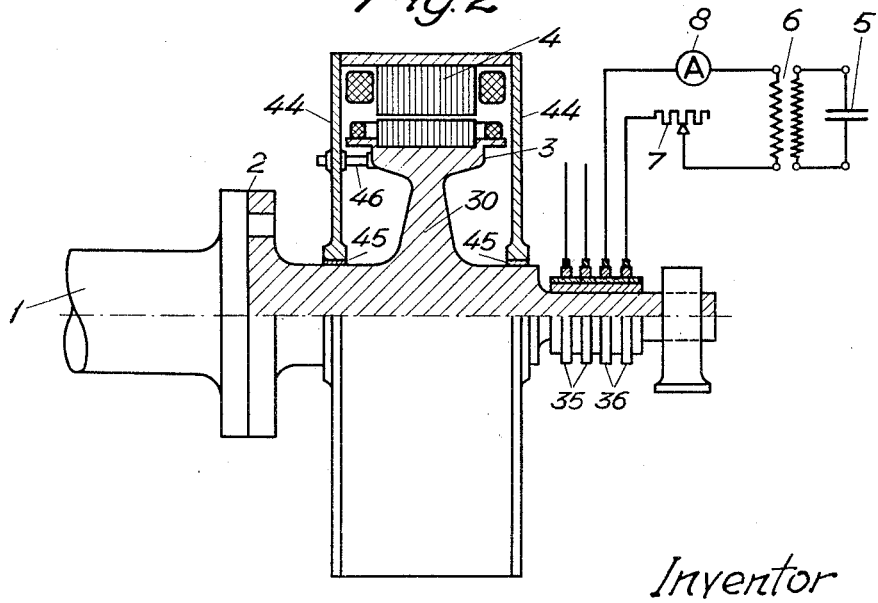

Two forms of the invention are illustrated in the accompanying drawings. Figs. 1 and 2 show an end view and a side view, partially in section, of the member mounted on the shaft of an oscillation damper having a mechanical driver, Fig. 2 further a diagram of connections of the load circuit. Fig. 3 shows a detail of Fig. 1 on a larger scale. Fig. 4 shows a detail, corresponding to Fig. 3, of an oscillating damper having a magnetic drive.

The oscillation damper consists, as aforesaid, of the capacitative load circuit, of a member rigidly connected to the part, the oscillations of which are to be damped, and a member which is more or less free to move with respect to the said part. In the form shown in Figs. 1-3, the part the oscillations of which are to be damped consists of a shaft 1 (the visible end of which is supposed to represent an antinode at the oscillations), and the first-named member is directly secured to the said shaft by a strong flange connection 2 which makes the member follow exactly the angular oscillations of the shaft. It is, however, also possible to interpose, between the shaft and the said member, a transmission for increasing the angular displacements of the member with respect to those of the shaft. Such a transmission must, however, permit a rigid transmission of all oscillations, for instance consist of a gearing of any suitable or well known form made with such precision that all clearances can be completely filled by force-transmitting oil films.

The two electrodynamically cooperating members 3, 4 offer certain resemblances to the armature and magnet wheel of a synchronous machine, but differ therefrom in essential respects. The member 3 rigidly connected to the shaft, which in the form shown presents the greatest similarity to the armature of the synchronous machine and therefore is termed the armature in the following lines, consists according to Fig. 2 of a center 30 in one solid piece and a magnetically active, laminated ring carrying the winding. The other member 4 has inwardly projecting poles carrying windings. As is clear especially from Fig. 3, which shows a portion of the electrodynamically active parts on a larger scale and in the mean mutual position about which they are intended to oscillate angularly, the armature winding consists of coils 34, each embracing a broad tooth 31 (see Fig. 3), which in the said mean position stands right opposite the interspace between the pole shoes 41 of the member 4, said member being referred to in the following as the pole wheel. Between two adjacent coils 34, thus right opposite the pole shoe, there is in the form shown a narrower tooth 32 which has, however, substantially a mechanically strengthening task and therefore also may be omitted, if it is found possible to fix the coils 34 sufficiently rigidly in the slots without the said tooth 32. Hereby the advantage of an increased winding space is gained.

At exactly the illustrated mutual position of the pole wheel 4 and the armature 3, the coils 34 are not traversed by any flux, but apart from the magnetically rather insignificant tooth 32 the whole flux from one pole to the next one enters the tooth 31 at one side and leaves it at the other and may thus be regarded as a pure leakage flux. When, on the contrary, on account of a mutual angular deviation, the peripheral overlapping between pole shoe and tooth is reduced at one side of the tooth and increased at the other, a portion of the flux from the air gap at the last-mentioned side is compelled to find its way through the tooth, the yoke plates 33, and the next tooth, the overlapping of which against one pole shoe has been increased as much as that of the first-named tooth against the same pole shoe has been reduced. If, for the sake of simplicity, the magneto-motive force necessary for the induction in the iron is assumed to be negligible as compared with that necessary for the air gap, exactly as much of the flux is forced through the tooth 31 as corresponds to the difference of overlapping between the two sides of the tooth. At constant air gap density, therefore, the time derivative of the flux through a tooth 31 will be directly proportional to the mutual angular speed between armature and pole wheel, and the E. M. F. in the coil 34 is in its turn proportional to the said time derivative. At a sinusoidal angular oscillation the amplitude of which is so limited, that an overlapping between pole shoe and tooth with normal flux density always remains at the maximum deviation, a sinusoidal E. M. F. will therefore be generated in the coil 34. On the other hand, the overlapping should preferably not be greater than the aforesaid one, as this causes an unnecessary leakage between the pole shoes. The tooth should therefore be about so much larger than the pole shoe as corresponds to the maximum deviation amplitude in both directions.

For accomplishing a maximum of damping it is desirable, that the damping torque reaches its maximum at the same time as the angular speed. The said torque is, however, proportional to the product of the total current volume in the armature and the practically constant induction in the air gap. The current should thus be in phase with the voltage, which as aforesaid reaches its maximum simultaneously with the angular speed. This result is accomplished, according to the present invention, by the capacitative load circuit, which should fully compensate the inductance of the winding and other possible inductances in the circuit at the frequency of the angular oscillations. In this manner, only the ohmic resistance will determine the current, whereby it will not only obtain the best phase but also a considerably higher value than with an uncompensated inductance. In this way it is possible, in spite of the comparatively small angular speed, to obtain a sufficient current in the machine for effectively damping the arising oscillations.

The difference between the generator formed by the two members 3 and 4 and a common electrical synchronous machine not only lies in the uncommon arrangement of the armature winding with its slots and teeth, but also in the form of the pole wheel. As only those portions of the air gap are effective in which the pole shoes 41 and the teeth 31 overlap each other, and as each of these parts, for the most common order of magnitude of the angular oscillations, need only have a width of some per cent of the air gap radius, thus of some tenths of one per cent of the periphery, said effective portions of the air gap will, even at a comparatively high number of poles, which possibly may be chosen for general constructional reasons, only form comparatively small portions of the total width of the pole shoes. As, on the other hand, the flux density in the pole core 42 hardly need be lower than in the air gap, the width of the pole core may be of the same order of magnitude as the effective air gap width, which makes a considerably smaller width than usual, whereby winding space is gained for the magnet coils 43 and the air gap induction can be kept high and the relative armature reaction low. Possibly the width of the pole core will be determined more by mechanical strength and stability reasons than by the magnetic conditions. As the effective portions of the pole shoes are subjected to a strongly variable induction, they are preferably laminated in a manner known per se. The saturation in the middle armature teeth is, on the contrary, constant and in the teeth embraced by the coils low, whence no attention has to be paid to magnetic losses in these teeth.

It would also be possible to use a pole wheel with permanent magnets, especially if it becomes possible to combine the high values of the coercive force of magnet steel obtained during recent years with an easier workability than hitherto. In such case it may be advisable to make the cross-section of the magnet cores greater than the effective air gap area for keeping the air gap induction higher than the remanent induction in the magnetic material.

In Fig. 2, the pole wheel 4 is carried by a pair of plane end disks 44 which are mounted on the hub of the armature 3 either by means of sliding bearings 45 or by means of elastic rings, for instance of rubber, as the mutual angular displacement is as a rule small, as aforesaid. As a connecting device, a flexible spring 46 has been shown, said spring connecting one of the discs 44 with the armature center near the periphery of the latter. Several springs of this kind may of course be employed. For admitting the current to the pole wheel, a pair of sliprings 35 are provided, and for conducting the current from the armature a pair of sliprings 36. All these sliprings may be mounted on the armature hub, as the angular movement of the pole wheel with respect thereto is small. In using permanent magnets, the sliprings 35 may be omitted.

The load circuit in Fig. 2 consists of a condenser 5 connected to the armature over a transformer 6 which often may be desirable, if the armature winding cannot be made for the preferable condenser voltage. A variable resistance 7 for adjusting the current to the suitable value and an ammeter 8 for reading this value have also been shown as connected in the circuit. Knowing the mean induction in the air gap, the maximum value of the damping torque can then be easily calculated.

Fig. 4 shows a driving device of another type, based on magnetic forces. In the periphery of the armature there are, substantially in the middle of some of the teeth 31, for instance in two diametrically opposite ones, recesses 37 of substantially the same width as the pole interspace. The induced voltage in the corresponding coil 34 is hereby reduced to about half value—as an angular displacement causes a reduction of the width of the effective air gap on one side but no corresponding increase on the other—but at the same time, the variation of the reluctance in the air gap along the periphery creates a magnetic directive force which serves as a substitute for the mechanical connecting devices. If the shaft rotates mostly in one direction, the recesses 37 may be somewhat displaced in this direction from the middle of the tooth 31, so that the tooth at such a mutual displacement between recess and pole interspace, which corresponds to the normal driving force required, stands symmetrically with respect to the pole interspace. If, at rapid accelerations or retardations, a driving torque is required which exceeds that created in the manner now described, projections 38 may be placed in the recesses 37 so as to engage more or less elastically against the pole shoes 41 when the normal angular displacement is exceeded. These projections may for instance be of rubber or lined with rubber on the surfaces resting against the pole shoes. Similar devices for transmitting larger acceleration torques may also be provided for supplementing the normally active mechanical connecting devices according to Fig. 2. Magnetic drivers of the type now described, based on a variation of the reluctance between pole wheel and armature along the periphery, may also be mounted beside the magnetic circuit proper so as not to weaken the normal action thereof.

As already mentioned, it is generally advisable to carry forth the comparatively free member by some kind of resilient driver, two forms of which have been shown and described. It is, however, also possible within the scope of the invention, to cause the said member to rotate freely with respect to the rigidly driven one and drive it only by means of a torque created according to the same principle as in an asynchronous motor, either by providing the armature with a separate winding for this purpose or by utilizing the eddy currents in solid parts therefor. The slip should, however, be kept so low that its frequency is several times lower than that of the angular oscillations, and that the current induced by the latter therefore will have time to rise to full value every time a tooth 31 in the armature passes a pole interspace in the pole wheel. As the damping reaches its full value only at this passage and sinks to zero between the passages, the armature should then be two- or threephase for creating a constant damping action. The introduction of a winding in the armature displaced 90° with respect to that shown in Fig. 3 need not materially weaken the action of either winding, as the central portion of each tooth 31 is not magnetically active to an essential degree but may leave space for a second winding without any serious inconvenience. Each phase winding should in such a case have a separate load circuit.

I claim as my invention:

1. Means for damping predetermined angular oscillations of a certain period in a rotating element, comprising a first rotary member rigidly connected with said element for rotation therewith, a second rotary member, means rotatably mounting said second rotary member adjacent the first member, magnet poles carried by one of said members, an armature winding of the alternating current type carried by the other of said members, a capacitative load circuit connected to said winding and dimensioned to substantially compensate the inductance thereof at said certain period whereby to tend to hold said magnet poles in certain angular position with respect to said armature winding by magnetically coupling said members, and means for connecting said elements whereby to couple the same upon predetermined relative angular movement therebetween but allowing comparatively free angular movement therebetween about said certain angular position.

2. The combination claimed in claim 1 the means for connecting said elements comprising a spring connected between said elements, the arrangement of said elements and spring being such that said spring is relaxed when said elements are in said certain angular relation, and stressed upon relative angular movement therebetween.

3. The combination claimed in claim 1, said means for connecting said elements comprising a stop on one of said elements and abutment means on the other of said elements on each side of said stop for respectively engaging the same upon relative rotation of said elements, said abutment means being angularly spaced from one another to allow freedom of movement of said stop therebetween, the mean position of said stop between said abutment means corresponding to said certain angular position.

4. The combination claimed in claim 1 said means for connecting said elements comprising a stop on one of said elements, a pair of abutment means on the other of said elements on each side of said stop for respectively engaging the same upon relative rotation of said elements but being angularly spaced from one another to allow freedom of movement of said stop therebetween, and comparatively weak spring means connected between said elements for resiliently urging said stop to a mean position between the extremes defined by said abutment means corresponding to said certain angular position.

5. Means for damping predetermined angular oscillations of a certain period in a rotating element, comprising a first rotary member rigidly connected with said element for rotation therewith, a second rotary member, means rotatably mounting said second rotary member adjacent the first member, a pair of angularly spaced magnet poles carried by one of said members, an armature winding of the alternating current type carried by the other member for cooperating with said poles and being, in a normal mean position, displaced 90 electrical degrees with respect to the axes of said poles, a capacitative load circuit connected to said winding and dimensioned to substantially compensate the inductance thereof at said certain period, and a spring connected between said members, the relation of said spring and members being such that the spring is comparatively unstressed when the members lie in such relative position that said winding is in said mean position between the axes of said magnet poles, and stressed upon relative rotation of said members from such position.

6. The combination claimed in claim 5, said magnet poles having spaced pole shoes, an armature iron tooth embraced by said armature winding for cooperating with said pole shoes, said tooth being wider than the pole shoe interspace by an amount equal to the total maximum oscillation amplitude in both directions of the first rotary member.

NILS ERICSON.